(12) United States Patent
Helbing et al.

(10) Patent No.: US 7,463,825 B2
(45) Date of Patent: Dec. 9, 2008

(54) CAMERA FLASH WITH IMPROVED COLOR BALANCE

(75) Inventors: Rene P. Helbing, Palo Alto, CA (US); Kee Yean Ng, Penang (MY); Janet Bee Yin Chua, Perak (MY); Wooi Kin Goon, Penang (MY); Thye Linn Mok, Penang (MY); Gim-Eng Chew, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 351 days.

(21) Appl. No.: 11/248,795

(22) Filed: Oct. 10, 2005

(65) Prior Publication Data

US 2007/0081811 A1   Apr. 12, 2007

(51) Int. Cl.
*G03B 15/06* (2006.01)
*G03B 15/03* (2006.01)

(52) U.S. Cl. .................. 396/182; 396/173; 396/200; 348/371

(58) Field of Classification Search ............... 396/182, 396/173, 176, 177, 178, 155, 200; 348/370, 348/371; 362/8, 11, 12, 16, 17, 612
See application file for complete search history.

(56) References Cited

U.S. PATENT DOCUMENTS

| | | | |
|---|---|---|---|
| 5,015,918 A | | 5/1991 | Copeland |
| 5,093,681 A | * | 3/1992 | Matsuzaki et al. .......... 396/163 |
| 5,895,128 A | * | 4/1999 | Kishimoto et al. ............ 396/61 |
| 6,351,610 B1 | * | 2/2002 | Numako et al. ............. 396/180 |
| 6,404,987 B1 | * | 6/2002 | Fukui .......................... 396/56 |
| 2003/0189664 A1 | * | 10/2003 | Olsson ...................... 348/365 |
| 2004/0101295 A1 | * | 5/2004 | Clark ........................... 396/56 |
| 2005/0157205 A1 | * | 7/2005 | Voss et al. .................. 348/370 |
| 2005/0157208 A1 | * | 7/2005 | Park et al. .................. 348/371 |
| 2005/0265014 A1 | * | 12/2005 | Matsui et al. ................. 362/5 |

FOREIGN PATENT DOCUMENTS

| | | |
|---|---|---|
| JP | 8-82738 | 3/1996 |
| JP | 10-203242 | 8/1998 |
| JP | 10-280341 | 10/1998 |
| JP | 11-352911 | 12/1999 |

* cited by examiner

*Primary Examiner*—W. B. Perkey
*Assistant Examiner*—David M. Schindler

(57) ABSTRACT

A camera flash is disclosed for producing a warm light having a desired color temperature. In one embodiment, the flash has a xenon flash component producing a light with a spectrum having a color temperature at a higher Kelvin rating than the warm light, and a light emitting diode flash component producing a light with a spectrum having a color temperature at a lower Kelvin rating than the warm light. The color temperature of the light of the xenon flash component and the color temperature of the light of the light emitting diode flash component together produce the warm light having the desired color temperature.

20 Claims, 8 Drawing Sheets

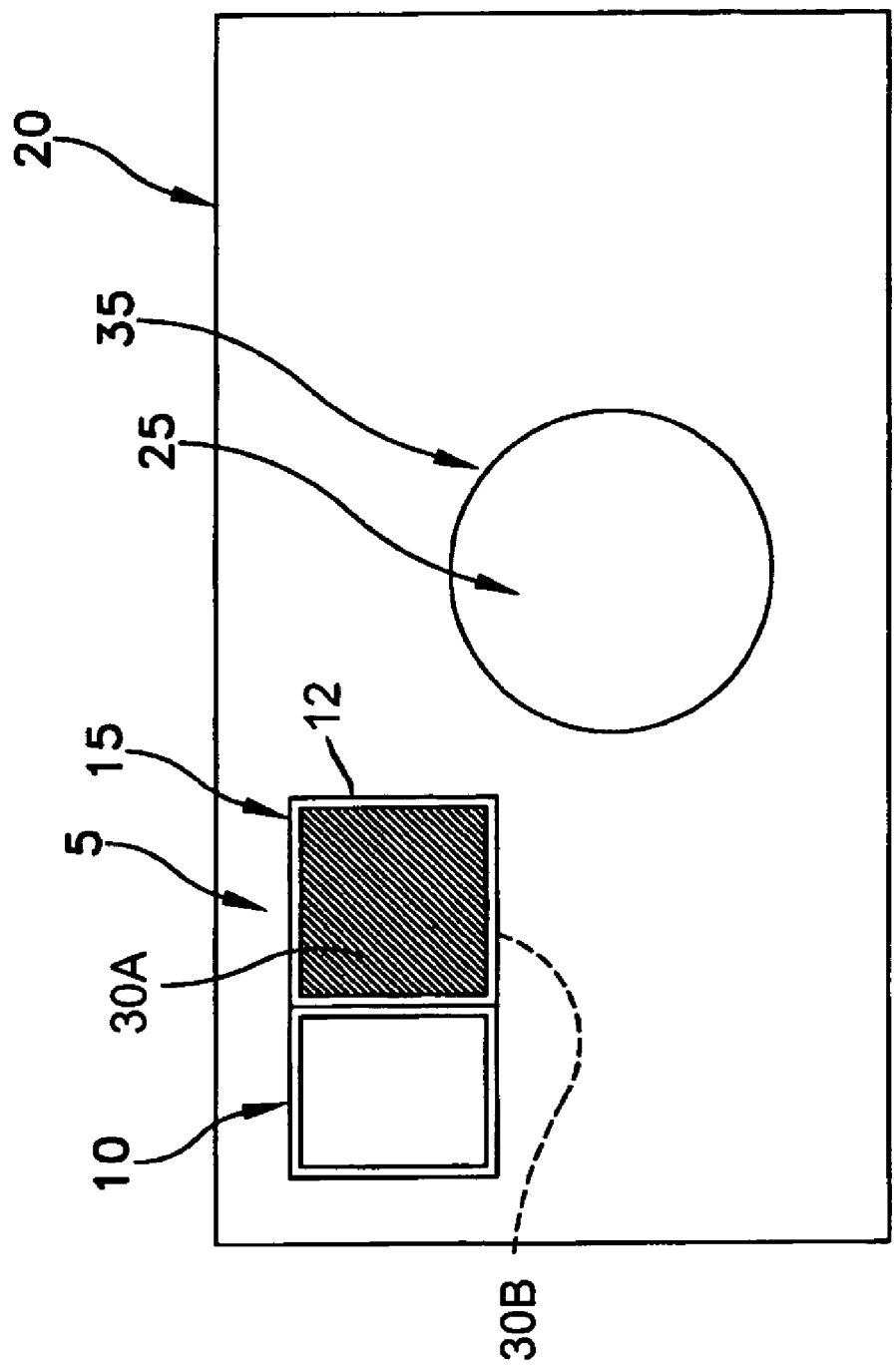

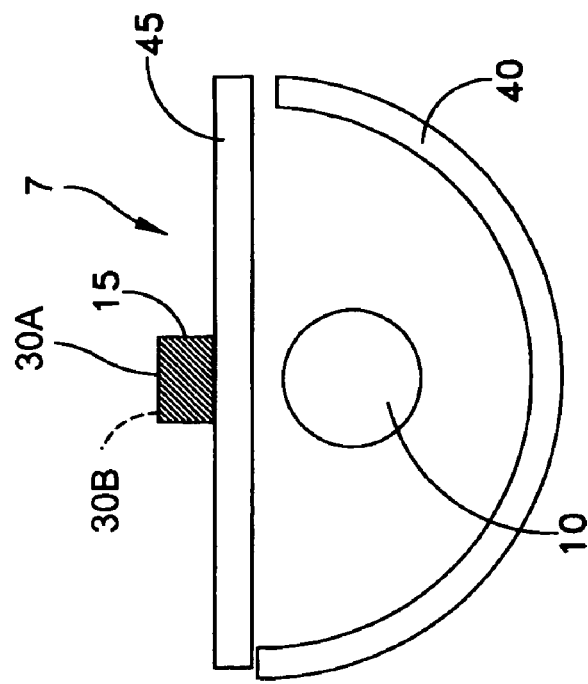
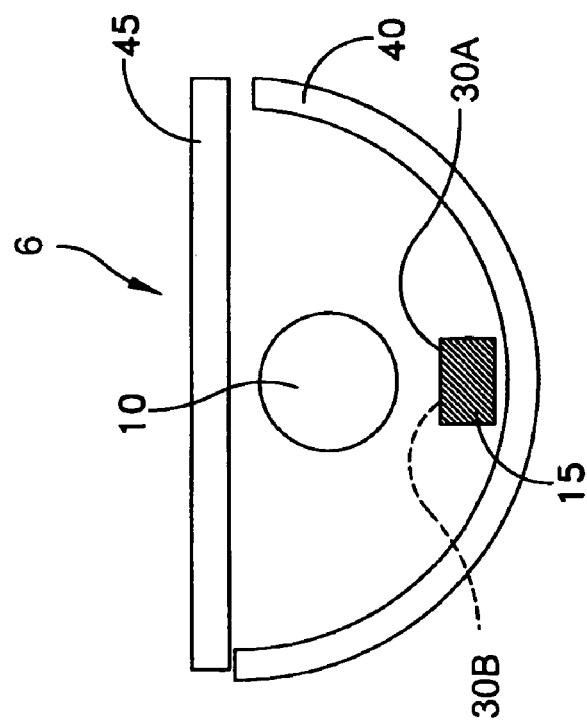

CAMERA FLASH WITH IMPROVED COLOR BALANCE

BACKGROUND

Most flash units in conventional and digital cameras are based on xenon flash discharge technology. The spectrum of the emitted light from a xenon flash is strongly shifted toward the blue wavelength range, i.e., the color temperature is very high and may be approximately 10,000 Kelvin. However, the color temperature of typical illumination sources is much lower. Daylight typically has a color temperature of about 5500 Kelvin. Indoor incandescent illumination has a color temperature of about 3000 Kelvin. While those sources are perceived as natural, and the color temperature at 5500 Kelvin is actually perceived as neutral white, the emitted light from a xenon flash illuminates a scene with a bluish color.

Using auto white balance, a digital camera may generally correct the difference in color temperature of various illuminants, but only to a certain degree. However, it is very difficult to compensate for a mixture of illuminants with disparate color temperatures, such as daylight at 5500 Kelvin and a xenon flash at 10,000 Kelvin, while taking a picture in daylight and using a xenon flash to eliminate shadows.

It would be helpful to provide better white balance with a camera flash. It would also be desirable to produce a warmer camera flash light having a desired color temperature.

SUMMARY OF THE INVENTION

In one embodiment, there is provided a camera flash for producing a warm light having a desired color temperature. The camera flash comprises 1) a xenon flash component producing a light with a spectrum having a color temperature at a higher Kelvin rating than the desired color temperature of the warm light; and 2) a light emitting diode (LED) flash component producing a light with a spectrum having a color temperature at a lower Kelvin rating than the desired color temperature of the warm light. The color temperature of the xenon flash component and the color temperature of the LED flash component together produce the warm light having the desired color temperature.

In another embodiment, there is provided a method for producing a warm light having a desired color temperature. The method comprises 1) producing a light with a spectrum having a color temperature at a higher Kelvin rating than the desired color temperature of the warm light, wherein the light at the higher Kelvin rating is produced with a xenon flash component; and 2) producing a light with a spectrum having a color temperature at a lower Kelvin rating than the desired color temperature of the warm light, wherein the light at the lower Kelvin rating is produced with a LED flash component. The color temperature of the light of the xenon flash component and the color temperature of the light of the LED flash component together produce the warm light having the desired color temperature.

Other embodiments are also disclosed.

BRIEF DESCRIPTION OF THE DRAWINGS

Illustrative embodiments of the invention are illustrated in the drawings, in which:

FIG. 2 illustrates a xenon flash component and an LED flash component in attachment to a camera in a side-by-side arrangement;

FIG. 3A illustrates a xenon flash component and a LED flash component in attachment to one another with the LED flash component mounted in the reflector;

FIG. 3B illustrates a xenon flash component and an LED flash component in attachment to one another with the LED flash component mounted on a window of the reflector;

DETAILED DESCRIPTION OF AN EMBODIMENT

Figure 1:
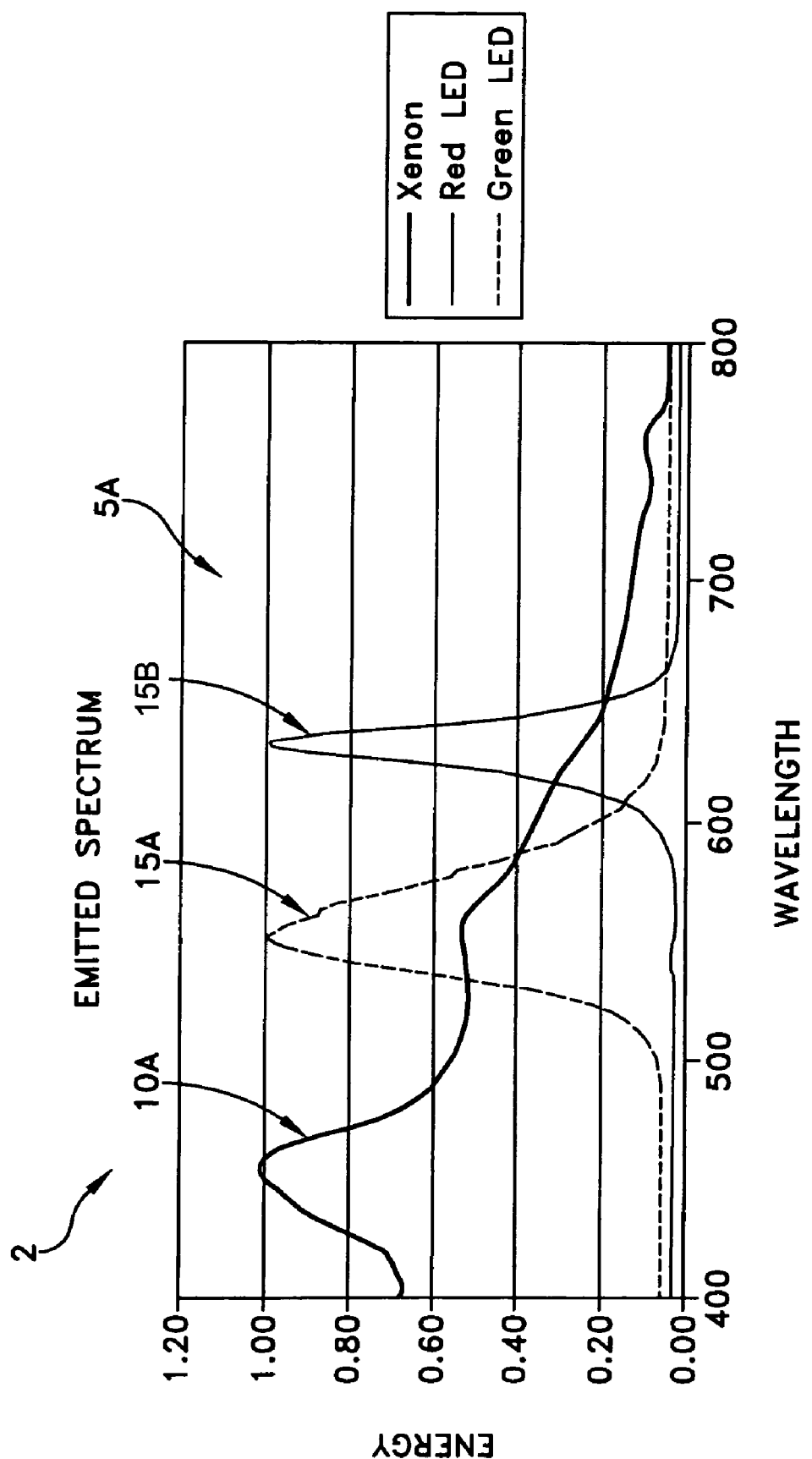
FIG. 1 illustrates a graph of the spectra of a xenon discharge flash, a green LED and a red LED.

Referring to FIG. 1, there is shown a graph 2 of the spectrum of a warm light 5A having a desired color temperature. Note that the spectrum of the warm light 5A is composed of a plurality of individual light spectrums (i.e., the spectrums of light 10A, 15A and 15B). The power and breadth of these spectrums combine to form the warm light 5A. By way of example, the light 5A may be formed by operation of a xenon discharge flash producing the light 10A, a green light emitting diode (LED) producing the light 15A, and a red LED producing the light 15B.

FIGS. 2-5 illustrate different embodiments of a camera flash for producing warm light such as the warm light 5A shown in FIG. 1. Each of the camera flashes (labeled 5, 6, 7, 8 and 9) comprises a first flash component 10 and a second flash component 15. The first flash component 10 may produce a light 10A with a spectrum having a color temperature at a higher Kelvin rating than the desired color temperature of warm light 5A. The second flash component 15 may produce a light (15A and/or 15B) with a spectrum having a color temperature at a lower Kelvin rating than the desired color temperature of the warm light 5A. The color temperature of the light 10A of the first flash component 10, and the color temperature of the light (15A and/or 15B) of the second flash component 15, together produce the warm light 5A having the desired color temperature.

By way of example, the first flash component 10 may comprise a xenon flash component, and the second flash component 15 may comprise one or more LED flash components 30A, 30B. Together, the color temperature of the light 10A produced by the xenon flash component 10, and the color temperature of the light (15A and/or 15B) produced by the LED flash component 15, produce the warm light 5A having the desired color temperature.

In one embodiment, the LED flash component 15 may consist of a single LED 30A. Alternately, the LED flash component 15 may comprise two or more LEDs, such as LEDs 30A and 30B. One of the two or more LEDs 30A, 30B may produce light 15A having a different wavelength than the light 15B of another one of the LEDs 30A, 30B. In some cases, the LEDs 30A, 30B may comprise LEDs selected from the group consisting of: a green LED, an amber LED, and a red LED.

For a camera having a CCD (charge-coupled device), the timing of the light 10A, 15A produced by the xenon and LED flash components 10, 15 is generally not critical. However, for a camera having a CMOS (complimentary metal-oxide semiconductor) sensor that is read out row by row, the timing of the light 10A must occur during the integration overlap of each of the rows. Also, as energy is a product of power and time, and the power of the light 10A of xenon flash component 10 is generally much greater than the power of lights 15A and 15B of the LED flash component(s) 30A, 30B, the application time of the LED flash component(s) 30A, 30B generally needs to be much longer than the application time of xenon flash component 10 to deliver a comparable amount of energy for light 10A versus lights 15A and 15B.

In one embodiment, a control system may be provided to time the operation of the xenon and LED flash components 10, 30A, 30B, to cause the color temperature of the light of the xenon flash component 10, and the color temperature of the light of the LED flash component(s) 30A, 30B, to combine to produce the warm light 5A having the desired color temperature. The control system may time the operation of the flash components 10, 30A, 30B in various ways.

In most cases, the control system will cause the xenon and LED flash components 10, 30A, 30B to produce light in a period when a camera 20 captures an image. In some cases, this may involve causing the xenon and/or LED flash components 10, 30A, 30B to produce light during a period when a camera shutter 25 is open, and when a camera 20 is capturing an image (i.e., in the case of film or digital shutter cameras). In other cases, this may involve causing the xenon and/or LED flash components 10, 30A, 30B to produce light during a digital integration time period of a camera 20 (i.e., in the case of some digital cameras).

The control system may also time the duration and overlap of operation of the xenon and LED flash components 10, 30A, 30B. For example, and given that the power of the light 10A of a xenon flash component 10 is generally much greater than the power of lights 15A and 15B of the LED flash component(s) 30A, 30B, the control system may cause the LED flash component(s) 30A, 30B to produce light 15A, 15B for a duration that is substantially equal to a period when a camera 20 captures an image, and may cause the xenon flash component 10 to produce light 10A for a duration that is substantially less than the period when the camera 20 captures the image.

The xenon and LED flash components 10, 30A, 30B may be packaged in various ways with respect to one another. Often, the flash components 10, 30A, 30B may be positioned or packaged together in a single flash component housing 12. The single flash component housing 12 may then be 1) affixed to a camera 20 (see, for example, the camera 20 shown in FIG. 2, in which xenon and LED flash components 10, 30A, 30B are mounted side-by-side on one side of a camera lens 35); 2) selectively attached to a camera 20, such as, in the form of a camera-mounted flash accessory 8 (see FIG. 4); or 3) configured to be positioned remote from a camera 20, such as, in a handheld flash accessory.

Figure 5:
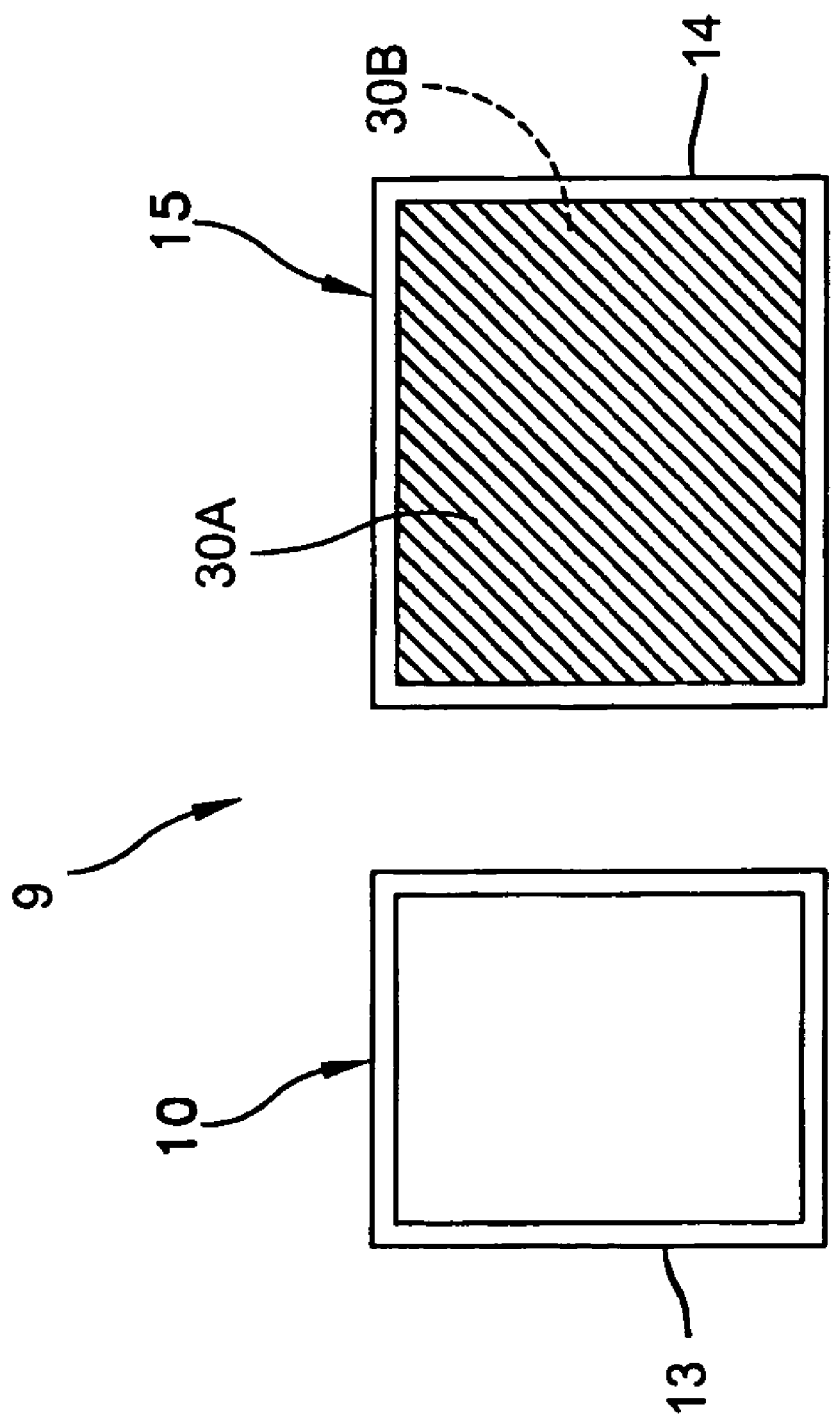
FIG. 5 illustrates a xenon flash component and an LED flash component separate from one another.

Alternately, the xenon and LED flash components 10, 30A/30B may be respectively positioned in first and second housings 13, 14 that are unconnected to (or detachable from) one another (see FIG. 5). In the case of separate housings 13, 14, both of the housings 13, 14 may be configured for handheld or remote use. Alternately, one of the housings may be selectively attached to a camera, and the other housing may be configured for handheld use. In yet another embodiment, one of the housings may be affixed to (or installed in) a camera, and the other housing may be 1) configured for handheld use, or 2) selectively attached to a camera. The latter form of packaging can be useful in supplementing a camera's built-in xenon flash component 10 with an accessory LED flash component 30A and/or 30B. In some cases, operation of the accessory flash component may be triggered by operation of the built-in flash component.

Figure 4:
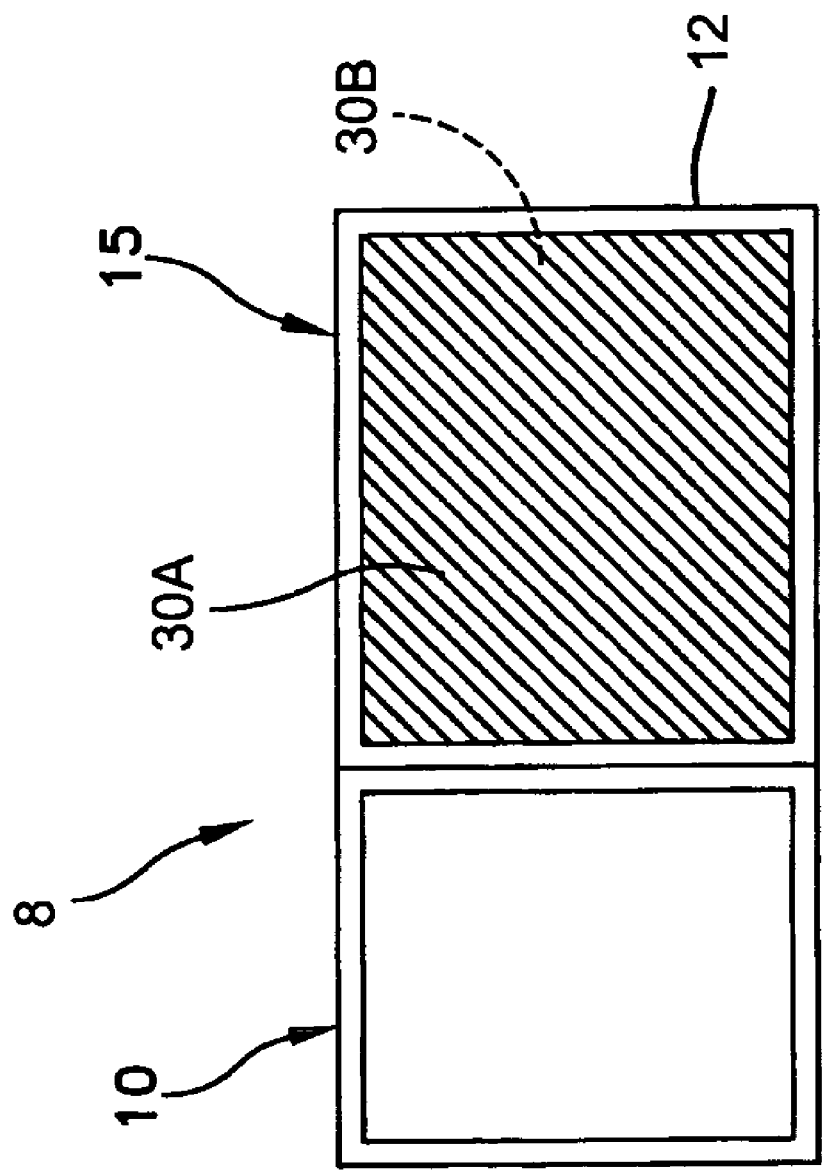
FIG. 4 illustrates a xenon flash component and an LED flash component in attachment to one another in a unit separate from a camera.

Referring to FIG. 3A, there is shown a camera flash 6 comprising a reflector structure 40 in which the xenon and LED flash components 10, 30A, 30B are positioned. Referring to FIG. 3B, there is shown a camera flash 7 comprising a reflector structure 40, and a window structure 45 that is disposed over reflector structure 40. A xenon flash component 10 is positioned within the reflector structure 40, and an LED flash component 30A, 30B is positioned on the window structure 45. In some embodiments, the camera flashes 6 and 7 may be incorporated into the camera 20 (FIG. 2) or the flash accessory 8 (FIG. 4).

Figure 8:
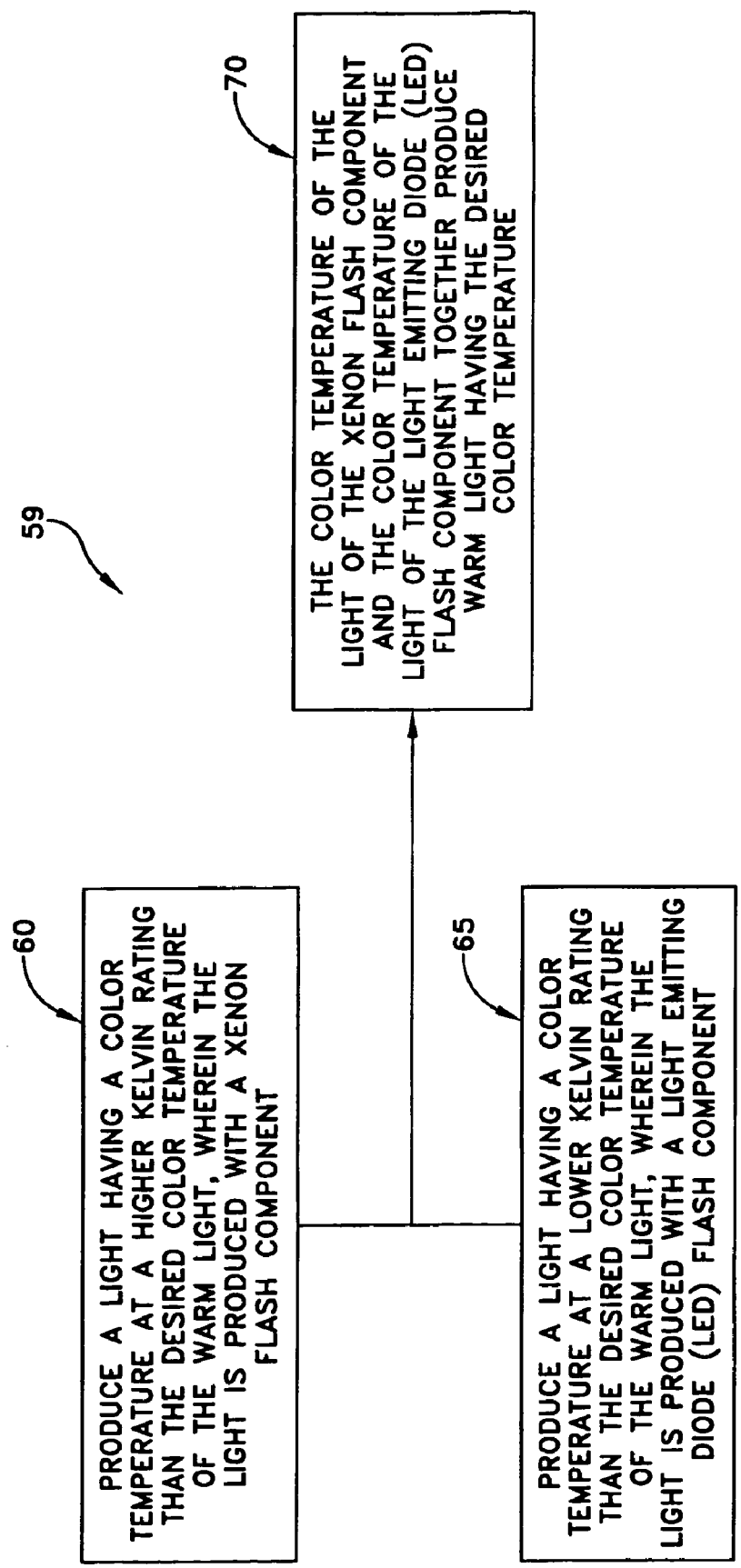
FIG. 8 illustrates a flow diagram of a method for producing a warm light having a desired color temperature with a camera flash.

Referring to FIG. 8, there is shown a method 59 for using a camera flash to produce a warm light having a desired color temperature. Generally, the method comprises 1) producing 60 a light with a spectrum having a color temperature at a higher Kelvin rating than the desired color temperature of the warm light, and 2) producing 65 a light with a spectrum having a color temperature at a lower Kelvin rating than the desired color temperature of the warm light. In one embodiment, the light at the lower Kelvin rating is produced with a xenon flash component; and the light at the higher Kelvin rating is produced with an LED flash component. The color temperature of the light of the xenon flash component, and the color temperature of the light of the LED flash component, together produce 70 the warm light having the desired color temperature.

Generally, the step 60 of producing the light at a higher Kelvin rating than the desired color temperature, and the step 65 of producing the light at a lower Kelvin rating than the desired color temperature of the warm light, occur within the period that a camera captures an image.

In one embodiment, light with a stronger component in the green or red part of the spectrum is produced with an LED flash component comprising a single LED. In another embodiment, the light is produced with an LED flash component comprising at least two LEDs. Optionally, each one of the at least two LEDs may be selectively actuated with respect to another one of the at least two LEDs.

FIG. 1 shows the combined spectra of a xenon flash component 10 and LED flash components 30A and 30B. Generally, the wavelengths of light 15A, 15B of the LED flash components 30A, 30B are selected to fill in an energy drop of the light 0A of the xenon flash component 10 at longer wavelengths. In one embodiment, the wavelength(s) for an LED flash component 30A (and/or 30B) may include yellowish-green wavelengths and/or, especially, red wavelengths.

Figure 6:
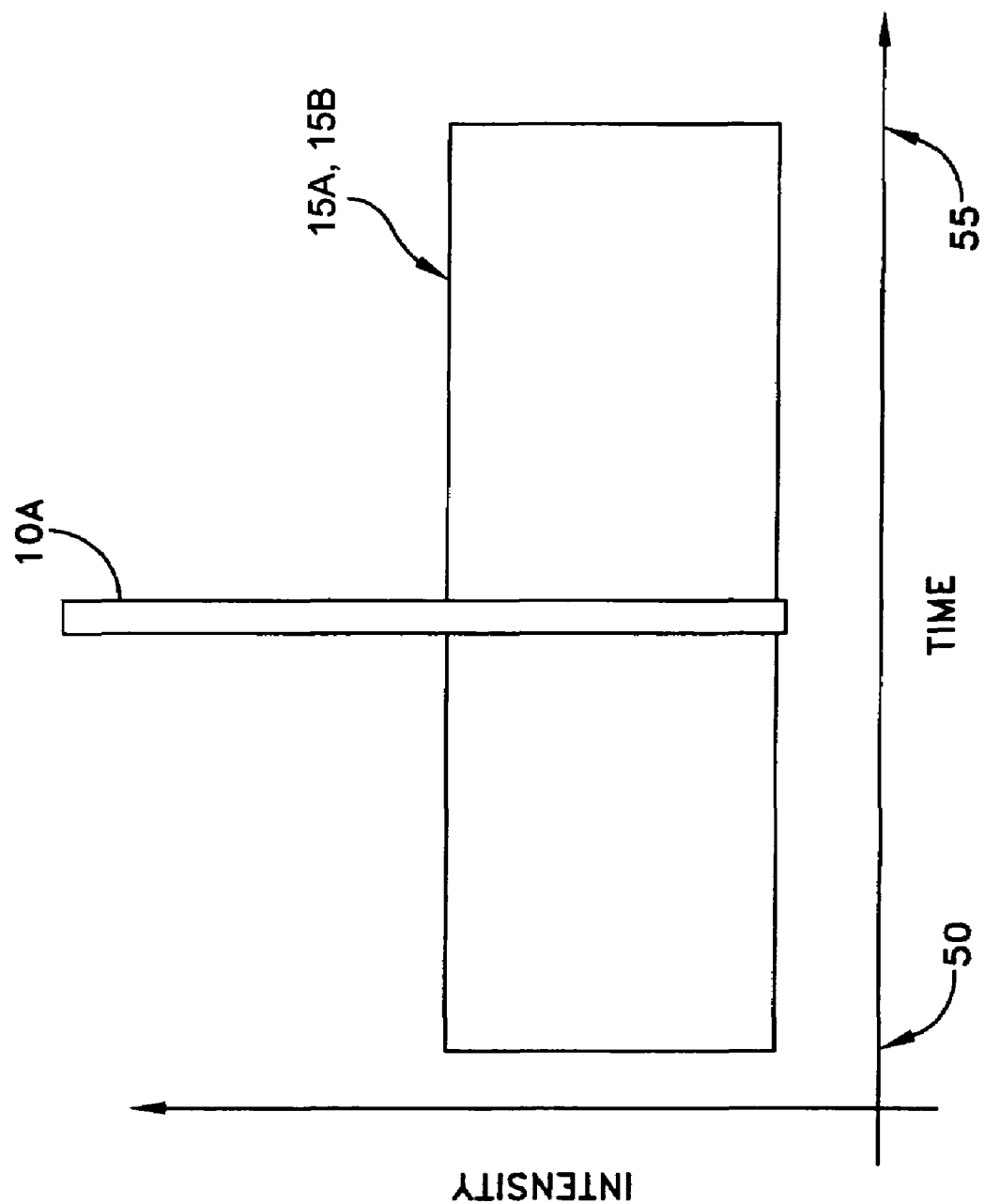
FIG. 6 illustrates flash timing of a xenon flash component and an LED flash component.

In one embodiment, and referring to FIG. 6, there is a synchronized timing of xenon flash component 10 and LED flash components 30A, 30B, as each has a different time constant than the other. Generally, the light 10A from the xenon flash component 10 is very intense and very short in duration, while the light 15A from the LED flash component 15 is relatively moderate in intensity and longer in duration.

Figure 7:
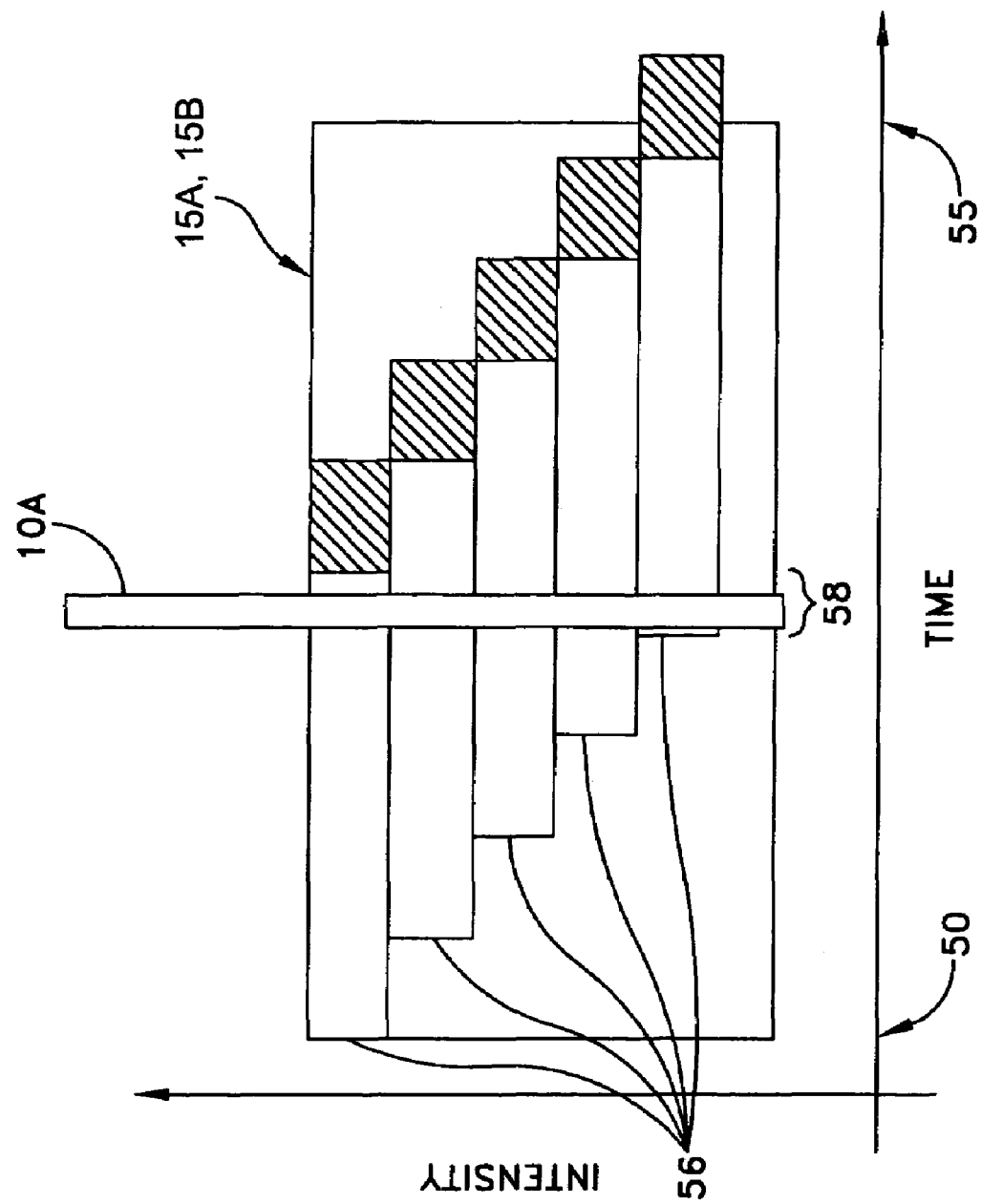
FIG. 7 illustrates flash timing of a a xenon flash component and an LED flash component for a CCD device.

Looking at FIG. 7, there is shown an example of the flash timing of light 10A emitted by the xenon flash component 10, and light 15A emitted by the LED flash components 30A, 30B for a CMOS camera device without shutter. Generally, light 10A from the xenon flash component 10, and light 15A, 15B from the LED flash components 30A, 30B, should be emitted for reception by all of the rows 56 of a sensor during the imaging process; and light 10A from the xenon flash 10 should generally be produced within a region 58 in which each of the rows 56 are integrating within the imaging process. In contrast to a CMOS-based camera, a CCD-based camera does not generally require application of light 10A from xenon flash component 10, or light 15A, 15B from LED flash components 30A, 30B, at any specific time during the imaging process.

Furthermore, camera shutter 25 is generally opened proximate in time to a beginning 50 of light 15A, 15B, and is generally closed proximate in time to an end 55 of light 15A, 15B. The time period from beginning 50 to end 55 generally coincides with either the integration time for a digital camera 20 without a shutter, or for digital or film cameras 20 having a shutter 25.

In one embodiment (e.g., for a small module for a camera cellular phone), the energy output of xenon flash component 10 may be about 10 lumen seconds (lm·s), and the energy output of an LED flash components 30A may be about 12 lumen seconds (lm·s) (e.g., by activating LUMILED® red LEDs at 120 lumens at 1A for 100 milliseconds). In this manner, the energy output of the xenon flash component 10 and the LED flash component 30A will be substantially equal to one another.

What is claimed is:

1. A camera flash for producing a warm light having a desired color temperature, the camera flash comprising:
   a xenon flash component producing a light with a spectrum having a color temperature at a higher Kelvin rating than the desired color temperature of the warm light;
   a light emitting diode (LED) flash component producing a light with a spectrum having a color temperature at a lower Kelvin rating than the desired color temperature of the warm light, wherein the color temperature of the light of the xenon flash component and the color temperature of the light of the LED flash component together produce the warm light having the desired color temperature, and wherein one of the xenon flash component and the LED flash component is attached to a camera and the other one of the xenon flash component and the LED flash component is a handheld accessory that is not attached to the camera; and
   a control system configured to activate the xenon flash component for a first period of time and the LED flash component for a second period of time, wherein the second period of time is greater than the first period of time and is selected based on the energy level of light produced by the LED flash component in comparison to the energy level of light produced by the xenon flash component.

2. A camera flash in accordance with claim 1, wherein the control system activates the xenon and LED flash components to produce light during a time interval when a camera shutter is open, with a start of the second time period substantially coinciding with opening of the camera shutter, an end of the second time period substantially coinciding with closing of the camera shutter, a start of the first period occurring after the start of the second period, and an end of the first period occurring before the end of the second period.

3. A camera flash in accordance with claim 1, wherein the control system activates the xenon and LED flash components to produce light during a digital integration time period of a camera.

4. A camera flash in accordance with claim 1, wherein the control system activates the LED flash component to produce light for a duration that is substantially equal to a time interval when a camera captures an image, and wherein the control system activates the xenon flash component to produce light for a duration that is substantially less than the time interval when the camera captures the image.

5. A camera flash in accordance with claim 1, wherein the energy level of light produced by the xenon flash component is about 10 lumen seconds, and the energy level of light produced by the LED flash component is about 12 lumen seconds, wherein the LED flash component is a red LED configured to be active for 100 milliseconds while producing 120 lumens at 1 ampere.

6. A camera flash in accordance with claim 1, wherein the LED flash component is activated during an imaging process when all rows of an image sensor of a camera are configured to receive light, and wherein the xenon flash component is activated only when each of the rows of the image sensor is integrating.

7. A camera flash in accordance with claim 6, wherein the camera is a CMOS-based camera.

8. A camera flash in accordance with claim 1, wherein the spectrum of the xenon flash component contains predominantly blue wavelengths and wherein the spectrum of the LED flash component comprises predominantly red wavelengths produced by a first LED and predominantly green wavelengths produced by a second LED, the red and green wavelengths selected to complement the blue wavelengths for producing a desired light spectrum.

9. A camera flash in accordance with claim 1, wherein the LED flash component comprises two LEDs, and wherein the control system is configured to selectively activate one of the two LEDs.

10. A camera flash in accordance with claim 4, wherein the control system deactivates the xenon flash component prior to the end of the time interval when the camera captures the image.

11. A camera flash for producing a warm light having a desired color temperature, the camera flash comprising:
   a xenon flash component producing a light with a spectrum having a color temperature at a higher Kelvin rating than the desired color temperature of the warm light;
   a light emitting diode (LED) flash component producing a light with a spectrum having a color temperature at a lower Kelvin rating than the desired color temperature of the warm light, wherein the color temperature of the light of the xenon flash component and the color temperature of the light of the LED flash component together produce the warm light having the desired color temperature;
   a reflector structure, wherein the LED flash component is positioned behind the xenon flash component within the reflector structure; and
   a control system configured to activate the xenon flash component for a first period of time and the LED flash component for a second period of time, wherein the second period of time is greater than the first period of time and is selected based on the energy level of light produced by the LED flash component in comparison to the energy level of light produced by the xenon flash component.

12. A camera flash in accordance with claim 11, wherein the control system activates the xenon and LED flash components to produce light during a time interval when a camera shutter is open, with a start of the second time period substantially coinciding with opening of the camera shutter, an end of the second time period substantially coinciding with closing of the camera shutter, a start of the first period ocurring after the start of the second period, and an end of the first period occuring before the end of the second period.

13. A camera flash in accordance with claim 11, wherein the control system activates the xenon and LED flash components to produce light during a digital integration time period of a camera.

14. A camera flash in accordance with claim 11, wherein the control system activates the LED flash component to produce light for a duration that is substantially equal to a time interval when a camera captures an image, and wherein the control system activates the xenon flash component to produce light for a duration that is substantially less than the time interval when the camera captures the image.

15. A camera flash in accordance with claim 11, wherein the LED flash component comprises two LEDs, and wherein the control system is configured to selectively activate one of the two LEDs.

16. A camera flash for producing a warm light having a desired color temperature, the camera flash comprising:
   a xenon flash component producing a light with a spectrum having a color temperature at a higher Kelvin rating than the desired color temperature of the warm light;
   a light emitting diode (LED) flash component producing a light with a spectrum having a color temperature at a lower Kelvin rating than the desired color temperature of the warm light, wherein the color temperature of the light of the xenon flash component and the color temperature of the light of the LED flash component together produce the warm light having the desired color temperature;
   a reflector structure;
   a window structure disposed over the reflector structure, with the xenon flash component positioned within the reflector structure and the LED flash component positioned on an outside surface of the window structure; and
   a control system configured to activate the xenon flash component for a first period of time and the LED flash component for a second period of time, wherein the second period of time is greater than the first period of time and is selected based on the energy level of light produced by the LED flash component in comparison to the energy level of light produced by the xenon flash component.

17. A camera flash in accordance with claim 16, wherein the control system activates the xenon and LED flash components to produce light during a time interval when a camera shutter is open, with a start of the second time period substantially coinciding with opening of the camera shutter, an end of the second time period substantially coinciding with closing of the camera shutter, a start of the first period ocurring after the start of the second period, and an end of the first period occuring before the end of the second period.

18. A camera flash in accordance with claim 16, wherein the control system activates the xenon and LED flash components to produce light during a digital integration time period of a camera.

19. A camera flash in accordance with claim 16, wherein the control system activates the LED flash component to produce light for a duration that is substantially equal to a time interval when a camera captures an image, and wherein the control system activates the xenon flash component to produce light for a duration that is substantially less than the time interval when the camera captures the image.

20. A camera flash in accordance with claim 16, wherein the LED flash component comprises two LEDs, and wherein the control system is configured to selectively activate one of the two LEDs.

\* \* \* \* \*

UNITED STATES PATENT AND TRADEMARK OFFICE
CERTIFICATE OF CORRECTION

PATENT NO.       : 7,463,825 B2
APPLICATION NO.  : 11/248795
DATED            : December 9, 2008
INVENTOR(S)      : Rene P. Helbing et al.

It is certified that error appears in the above-identified patent and that said Letters Patent is hereby corrected as shown below:

Title Page, Column 2 (Abstract), Line 9, after "temperature" delete "of the light";

Column 6, Line 65, Claim 12, delete "ocurring" and insert -- occurring --;

Column 6, Line 67, Claim 12, delete "occuring" and insert -- occurring --;

Column 8, Line 15, Claim 17, delete "ocurring" and insert -- occurring --;

Column 8, Line 17, Claim 17, delete "occuring" and insert -- occurring --.

Signed and Sealed this

Ninth Day of November, 2010

David J. Kappos
*Director of the United States Patent and Trademark Office*